United States Patent [19]
Schmidt et al.

[11] 3,831,634
[45] Aug. 27, 1974

[54] CHARGING CYLINDER FOR A VACUUM OPERATED HYDRODYNAMIC BRAKE SYSTEM

[75] Inventors: Herbert Schmidt; Rolf Weiler; Erhard Czich, all of Frankfurt, Germany

[73] Assignee: ITT Industries, Inc., New York, N.Y.

[22] Filed: Jan. 15, 1973

[21] Appl. No.: 323,461

[30] Foreign Application Priority Data
Jan. 22, 1972  Germany............................ 2202997

[52] U.S. Cl.................... 138/26, 138/37, 138/178, 303/66, 303/81
[51] Int. Cl............................ F16l 51/00, F15d 1/10
[58] Field of Search ................ 138/26, 37, 42, 178; 303/64, 66, 68, 81, 83; 60/478; 137/572

[56] References Cited
UNITED STATES PATENTS
2,350,242  5/1944  McAlpine ............................ 303/68
2,748,900  6/1956  Booth et al. ........................ 188/274
3,223,118  12/1965  Hutelmyer .......................... 137/572

Primary Examiner—James J. Gill
Assistant Examiner—Anthony V. Ciarlante
Attorney, Agent, or Firm—John T. O'Halloran; Menotti Lombardi, Jr.; Alfred C. Hill

[57] ABSTRACT

This relates to a charging cylinder incorporated in a vacuum operated hydrodynamic brake system having a pressure medium (brake fluid) and air to actuate the brakes. In accordance with the present invention, the pooling of the pressure medium of a charging cylinder in the vacuum reservoir upon the return of the pressure medium and air from the hydrodynamic brake is eliminated by constructing the vacuum reservoir to also serve as a plenum chamber. This plenum chamber returns the pressure medium to the charging cylinder through a valve. An assembly is also provided in the charging cylinder to segregate the pressure medium from air as the pressure medium flows back from the brake and retains the pressure medium in the charging cylinder.

9 Claims, 2 Drawing Figures

CHARGING CYLINDER FOR A VACUUM OPERATED HYDRODYNAMIC BRAKE SYSTEM

BACKGROUND OF THE INVENTION

The invention relates to a charging cylinder for a hydrodynamic vacuum-operated brake system and more particularly to such a charging cylinder formed as an integral part with the vacuum reservoir.

As is known, in hydrodynamic brakes control is effected by means of compressed air via a charging cylinder. The charging cylinder is supplied by a compressed air reservoir (referred herein as a vacuum reservoir) which is controlled by a relay valve to apply pressure to the hydrodynamic brake. The charging cylinder has a capacity of about 14 liters, 50 percent of this volume is filled with oil (brake fluid or pressure medium) and the remaining part is filled with air. Before the control action is introduced, i.e., in no-load position of the brake, the area above the oil level is almost evacuated. During brake actuation, when compressed air is lead into the charging cylinder with a pressure of 7 bars, the air volume that is supplied to the charging cylinder amounts to about 49 liters so that the oil is pressure-applied and pressed into the turbo-brake chamber.

The time which is needed to supply a sufficient amount of compressed air to the charging cylinder determines the response time of the brake system. Time and again it happens that when the brake is released, or when the retarder is evacuated, oil is carried over into the vacuum reservoir where it forms an oil pool.

In order to solve this problem it has already been proposed to arrange the charging cylinder and the vacuum reservoir one above another as one integral part. A valve is provided at the partition (between the charging cylinder and the reservoir) which is pressure operated, allowing the oil that has gathered in the vacuum reservoir to flow back into the charging cylinder (see French Patent No. 1,077,217 corresponding to U.S. Pat. No. 2,748,900 and German Patent No. 1,961,420). However, the penetration of the pressure medium into the vacuum reservoir could not be prevented.

SUMMARY OF THE INVENTION

It is an object of the present invention to make use of the fact that the pressure medium penetrates into the vacuum reservoir by redesigning the charging cylinder and the vacuum reservoir to prevent the pressure medium from pooling in the reservoir.

A feature of the present invention is the provision of a charging cylinder arrangement for a vacuum-operated hydrodynamic brake system comprising: a charging cylinder; a vacuum reservoir connected to and above the charging cylinder; a partition wall disposed to separate the charging cylinder and the reservoir; a valve interconnecting the reservoir and the charging cylinder; the vacuum reservoir simultaneously serving as a plenum chamber for pressure medium flowing back from a hydrodynamic brake, the pressure medium being returned through the valve from the reservoir to the charging cylinder by air in the reservoir; and an assembly disposed in the charging cylinder to segregate the pressure medium from the air as the pressure medium flows back from the brake and to return the pressure medium in the charging cylinder.

Another feature of the present invention is that the valve between the charging cylinder and the vacuum reservoir is pressure operated and is also separately operated.

A further feature of the present invention is that the valve is open when the pressure in the vacuum reservoir and the charging cylinder is the same.

Still another feature of the present invention is that the valve is installed at the lowest point of the reservoir.

Still a further feature of the present invention is that the partition wall between charging cylinder and vacuum reservoir is convex in the direction of the vacuum reservoir and slightly inclined with respect to the vertical wall of both the charging cylinder and vacuum reservoir and that the valve is externally connected to the reservoir wall at the lowest point of the vacuum reservoir and the second connection of the valve is connected to a connection that is installed at a lower point within the charging cylinder.

Another feature of the present invention is that the partition wall between charging cylinder and vacuum reservoir is inclined or funnel-shaped and that the valve is provided at the lowest point within the reservoir.

A further feature of the present invention is that a funnel-shaped deflector is provided within the charging cylinder below the partition wall and that at the gate opening of the funnel-shaped deflector a horizontal deflector is provided supported from the funnel-shaped deflector by spaced angular bars with lateral through-holes between them.

Still a further feature of the present invention is that the connection that is connected with the valve opens into the chamber between partition wall and funnel-shaped deflector.

Another feature of the present invention is that the connector for the connection between the inside chamber of the hydrodynamic brake and the charging cylinder is directed tangentially into the charging cylinder bottom that is curved outwardly.

Still another feature of the present invention is that a fine ventilation bore is provided in the wall of the vacuum reservoir.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
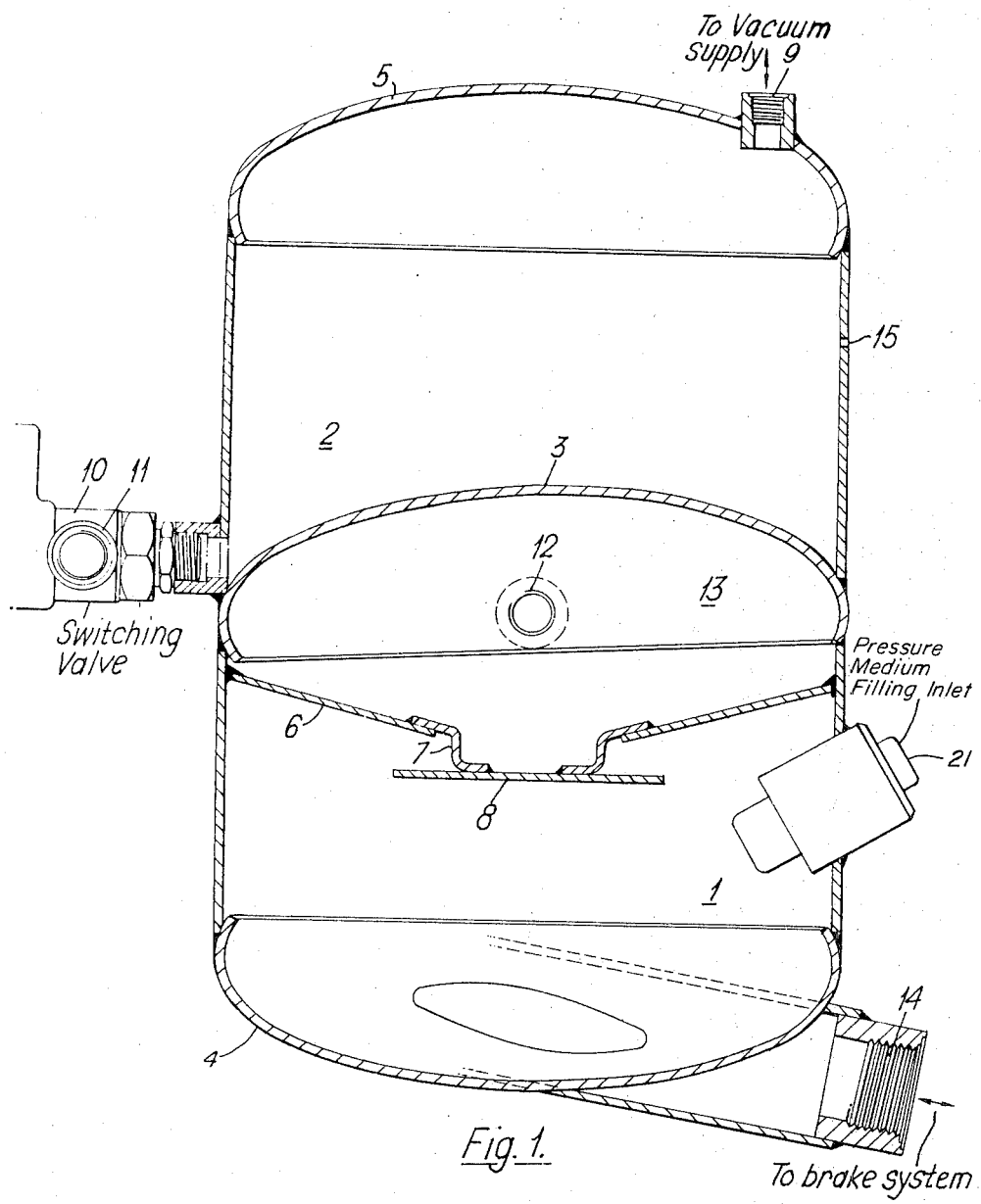
FIG. 1 is a longitudinal cross sectional view of one embodiment of the charging cylinder in accordance with the principles of the present invention.

Referring to FIG. 1 the cylindrical charging cylinder 1 and the cylindrical vacuum reservoir 2 are mounted one above another and separated by a rounded partition wall 3 which protrudes into the inside of vacuum reservoir 2. According to the present invention this partition wall 3 has a slight inclination, for instance, 3° with respect to the vertical wall of both the charging cylinder and the reservoir.

The bottom 4 of charging cylinder 1 and the cover 5 of vacuum reservoir 2 are also curved outwardly and connected by welding with the cylindrical vertical walls of the two reservoirs. Below partition wall 3 a funnel-shaped deflector 6 is provided in charging cylinder 1. A horizontal deflector 8 is connected by welding to deflector 6 adjacent the gate opening of deflector 6 by spaced angular bars 7 leaving lateral through-holes. The diameter of horizontal deflector 8 should be larger than that of the gate opening of deflector 6.

A connector 9 is provided in cover 5 of the vacuum reservoir 2 for the vacuum supply (pump).

At the lowest point of vacuum reservoir 2, which is determined by the inclination of partition wall 3, a pressure-dependent switching valve 10 is installed whose connector, which is indicated by 11, is connected with another connector, situated at a somewhat lower point indicated at 12. Connector 12 opens into the chamber 13 formed between partition wall 3 and funnel-shaped deflector 6. The pressure medium that has gathered in vacuum reservoir 2 can thus flow through switching valve 10, which is installed at the lowest point of vacuum reservoir 2, as a result of the pressure head formed by air, through a conduit (not shown) between valve connector 11 and connector 12 into chamber 13. The pressure medium is then guided along funnel-shaped deflector 6, through the lateral throughholes holes between bars 7 and reenters charging cylinder 1.

In greater detail, in order to stop the braking action of the hydrodynamic brake, the pressure medium in the brake is sucked back into charging cylinder 1 via connector 14 by applying vacuum from reservoir 2 through valve 10 and a conduit (not shown) between connectors 11 and 12. As a result, when this action takes place air employed for charging the hydrodynamic brake and some of the pressure medium is sucked into reservoir 2 over the same path taken by the vacuum. This pressure medium is returned from reservoir 2 to charging cylinder 1 via the same path, namely, valve 10 and the conduit (not shown) between connectors 11 and 12 when the vacuum is interrupted. To charge or operate the hydrodynamic brake, compressed air is introduced into charging cylinder 1 via switch 10 and the conduit (not shown) between connectors 11 and 12. This air under pressure will force the pressure medium from charging cylinder 1 through connector 14 to the hydrodynamic brake. This is similar to the operation of the hydrodynamic brake disclosed in U.S. Pat. No. 3,139,158 and the above mentioned U.S. Pat. No. 2,748,900.

Switching valve 10 at the outside of vacuum reservoir 2 is arranged in the way shown on the drawing in order to make it possible to use any serially or mass produced valve of this type. If, however, the installation of a valve and a connecting tube to the connector 12 at the outside of the reservoir is to be avoided, it is, of course, possible to install a suitable valve within the reservoir at the partition wall at the lowest point of the vacuum reservoir. In this case the partition wall may be inclined or funnel-shaped, too. The installation of the valve at the outside of the reservoir, however, facilitates its supervision and, if need be, its exchange.

According to the invention the connector 14 for the connecting tube between charging cylinder 1 and the inside chamber of the hydrodynamic brake opens tangentially into charging cylinder 1 at bottom 4 that is curved to the outside. Thus, when the brake is released, the pressure medium flowing back from the brake is given a gyroscope or cyclone effect, whereby the pressure medium that is dispersed by air is centrifuged and the air or the oil foam is led off to chamber 13 via funnel-shaped deflector 6 and the condensing pressure medium flows back to charging cylinder 1. The purified oil is retained in charging cylinder 1 by means of the centrifugal action.

According to the invention vacuum reservoir 2 is deliberately used as a plenum chamber to receive the pressure medium when flowing back from the hydrodynamic brake from where the pressure medium is led back to charging cylinder 1 in the way described above.

Element 21 in the vertical wall of charging cylinder 1 is an inlet for filling charging cylinder 1 with pressure medium. This inlet is maintained closed at all times except when the pressure medium requires replenishing.

The operation of the arrangement of FIG. 1 through a braking cycle is as follows. When the hydrodynamic brake is not actuated, pressure medium will be in charging cylinder 1. Switching valve 10 connects vacuum reservoir 2 with charging cylinder through the conduit (not shown) between connectors 11 and 12. When the hydrodynamic brake is actuated, switching valve 10 interrupts the connection between charging cylinder 1 and reservoir 2 and introduces compressed air through the conduit (not shown) between connectors 11 and 12 into charging cylinder 1. The compressed air forces the pressure medium out of charging cylinder 1 to the hydrodynamic brake via connector 14. To release the brake, switching valve 10 interrupts the supply of compressed air and reestablishes the connection of charging cylinder 1 and reservoir 2. The vacuum then will suck the pressure medium from the hydrodynamic brake back into charging cylinder 1. Due to tangential relation between connector 14 and bottom 4 of charging cylinder 1, the pressure medium flowing back to cylinder 1 is given a cyclonic effect and, hence a centrifuged action takes place such that the air or pressure medium foam is led to chamber 13 via funnel shaped deflector 6 and the condensing pressure medium flows back to cylinder 1. The purified oil is retained in cylinder 1 by the centrifuged action. As indicated above some of the pressure medium along with air is sucked into reservoir 2 despite the centrifugal action imparted to the pressure medium. Reservoir 2 is so big that inside thereof the velocity of flow is very slow. This enables the pressure medium to sink down to the partition wall 3 instead of being entrapped with the flow to the vacuum source via connector 9. The pressure medium on wall 3 will then return to charging cylinder 1 via valve 10 and the conduit (not shown) between connectors 11 and 12 when the vacuum source is interrupted, such as when the engine of the motor vehicle is stopped.

Figure 2:
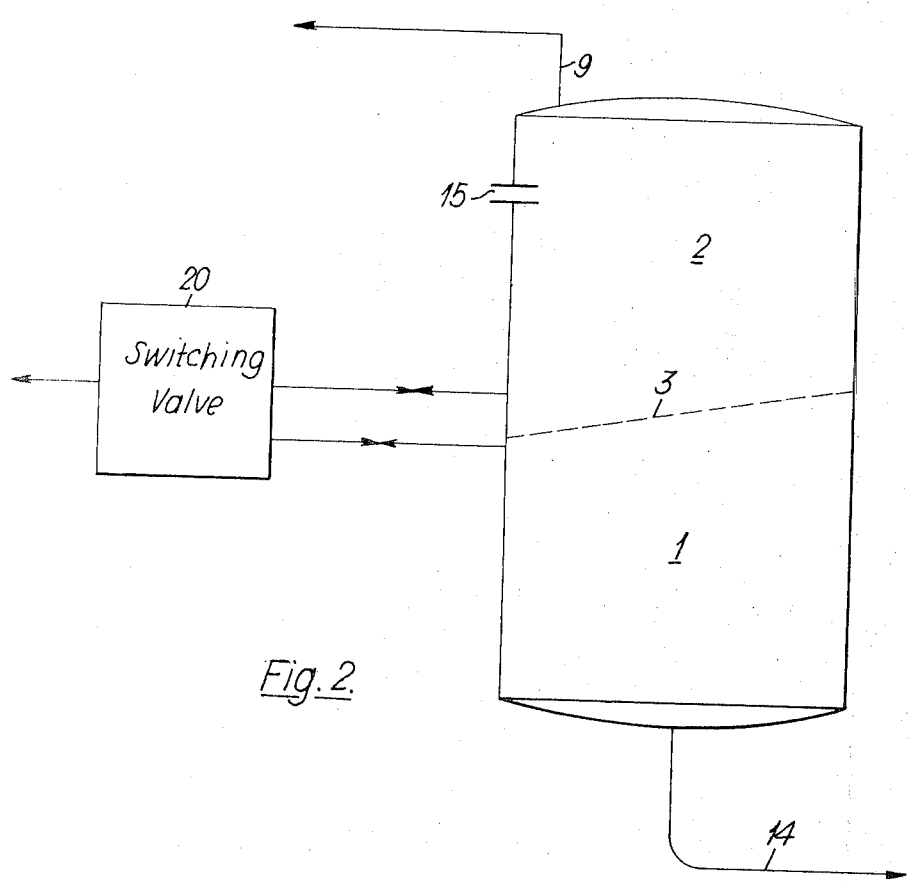
FIG. 2 is an outline drawing of another embodiment of the charging cylinder in accordance with the principles of the present invention.

FIG. 2 shows another embodiment of the present invention. Vacuum reservoir 2 and charging cylinder 1 are only connected by switching valve 20, which forms part of the control system of any hydrodynamic brake, and at an appropriate point a ventilation bore 15 is provided in the vertical wall of vacuum reservoir 2.

As has been said already, oil from charging cylinder 1 penetrates into vacuum reservoir 2. This oil has to be returned to charging cylinder 1. It was described with reference to FIG. 1 how to achieve this by means of the installation of a valve. According to FIG. 2 another way is demonstrated. Vacuum reservoir 2 is kept constantly under vacuum by means of a vacuum pump Vacuum reservoir 2 and charging cylinder 1 are connected by means of switching valve 20 forming part of the control of the retarder. When the turbo-brake is not actuated (no-load position) the connection between charging cylinder 1 and vacuum reservoir 2 is open. Yet no oil flows back to charging cylinder 1 since the necessary technical conditions are missing, for air must be introduced into the vacuum reservoir in order to allow the pressure medium to flow out. No change is brought about during operation by the provision of ventilation bore 15 in the vertical wall of vacuum reservoir 2. Ventilation bore 15 becomes effective only after the vacuum pump has been turned off. Air flows into vacuum reservoir 2 through bore 15 which leads to a pressure build-up in reservoir 2 and, thus, the oil in vacuum reservoir 2 is pressed back into charging cylinder 1 through switching valve 20.

It is not necessary that vacuum reservoir 2 and charging cylinder 1 are formed as an integral part.

It is a particularity of ventilation bore 15 that the oil is only led back after the vacuum pump has been turned off (stopping of the engine), which is sufficient in this case.

It is noteworthy that the oil can be led back without a valve being necessary that would only be another source of failure.

Necessary for the smooth functioning of ventilation bore 15, however, is that the outlet from vacuum reservoir 2 to switching valve 20 must be provided at the lowest point of vacuum reservoir 2 and that ventilation bore 15 must be above oil level.

The invention makes the sucking off of the pressure medium from the vacuum reservoir by means of a hand pump superfluous and the operation is maintenance-free. There is no loss of pressure medium in the system so that the operating safety is increased.

While we have described above the principles of our invention in connection with specific apparatus it is to be clearly understood that this description is made only by way of example and not as a limitation to the scope of our invention as set forth in the objects thereof and in the accompanying claims.

We claim:

1. A charging cylinder arrangement for a vacuum-operated hydrodynamic brake system comprising:
   a charging cylinder serving as a plenum chamber for a pressure medium, said charging cylinder having an outwardly rounded bottom containing a tangential connector;
   a vacuum reservoir connected to and above said charging cylinder;
   a partition inclined with respect to the vertical walls of said reservoir disposed to separate said charging cylinder and said reservoir;
   a valve interconnecting the lowest part of said reservoir with said charging cylinder whereby said pressure meduim is returned through said valve from said reservoir to said charging cylinder;
   and an assembly disposed inside said charging cylinder to retain said pressure medium inside said charging cylinder as said pressure medium flows back from said brake system.

2. A charging cylinder arrangement according to claim 1, wherein
   said valve is open when the pressure is the same in said reservoir and said charging cylinder.

3. A charging cylinder arrangement according to claim 1, wherein
   said valve is pressure operated.

4. A charging cylinder arrangement according to claim 1, wherein
   said partition wall is rounded to protrude into said reservoir.

5. A charging cylinder arrangement according to claim 1, wherein
   said valve is disposed outside said reservoir and said charging cylinder; and
   further including
   a first connection from said valve through the vertical wall of said reservoir at the lowest point of said reservoir; and
   a second connection from said valve through the vertical wall of said charging cylinder at a point lower than said first connection.

6. A charging cylinder arrangement according to claim 5, wherein
   said assembly includes
   a funnel-shaped deflector disposed in said charging cylinder, said funnel-shaped deflector having a gate opening,
   a horizontal deflector disposed in said charging cylinder in spaced relation to said gate opening, and
   a plurality of spaced angular bars to connect said horizontal deflector to said funnel-shaped deflector, said spaced bars providing lateral throughholes therebetween.

7. A charging cylinder arrangement according to claim 6, wherein
   said second connection opens into a chamber between said partition wall and said funnel-shaped deflector.

8. A charging cylinder arrangement according to claim 1, wherein
   said assembly includes
   a funnel-shaped deflector disposed in said charging cylinder, said funnel-shaped deflector having a gate opening,
   a horizontal deflector disposed in said charging cylinder in spaced relation to said gate opening, and
   a plurality of spaced angular bars to connect said horizontal deflector to said funnel-shaped deflector, said spaced bars providing lateral throughholes therebetween.

9. A charging cylinder arrangement according to claim 1, further including
   a fine ventilation bore through the vertical wall of said reservoir at a height above the level of returning pressure medium; and
   wherein
   said valve forms a part of a control for said brake system.

* * * * *